US012331695B1

(12) United States Patent
Kim et al.

(10) Patent No.: US 12,331,695 B1
(45) Date of Patent: Jun. 17, 2025

(54) APPARATUS OF CONTROLLING ENGINE AND METHOD THEREOF

(71) Applicants: HYUNDAI MOTOR COMPANY, Seoul (KR); KIA CORPORATION, Seoul (KR)

(72) Inventors: Minjae Kim, Seoul (KR); Hee Yong Choi, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/664,651

(22) Filed: May 15, 2024

(30) Foreign Application Priority Data

Dec. 15, 2023 (KR) ........................ 10-2023-0182798

(51) Int. Cl.
*F02D 41/40* (2006.01)
*F02D 19/06* (2006.01)

(52) U.S. Cl.
CPC ......... *F02D 41/405* (2013.01); *F02D 19/061* (2013.01); *F02D 2250/11* (2013.01)

(58) Field of Classification Search
CPC ... F02D 19/061; F02D 41/405; F02D 2250/11
See application file for complete search history.

(56) References Cited

U.S. PATENT DOCUMENTS 7,433,776 B1 * 10/2008 Hunter .................... F01M 11/10
123/568.22
2021/0102508 A1 * 4/2021 Fuki ........................ F02D 41/40

FOREIGN PATENT DOCUMENTS

EP 1617059 A1 * 1/2006 ........... F02D 41/029

* cited by examiner

*Primary Examiner* — Audrey B. Walter
(74) *Attorney, Agent, or Firm* — MCDONNELL BOEHNEN HULBERT & BERGHOFF LLP

(57) ABSTRACT

An apparatus of controlling an engine includes a controller determining an inflow fuel amount adsorbed on an inner wall of a cylinder, and introduced into an oil pan based on the density of a combustion chamber and a post injection fuel amount, determining a vaporization fuel amount vaporized in the inflow fuel amount based on an operating condition of an engine, determining a consumption fuel amount consumed in the vaporization fuel amount based on the operating condition of the engine, and determining a dilution rate of the engine oil based on the inflow fuel amount, the vaporization fuel amount, and the consumption fuel amount; and a display providing an alarm to a driver when the dilution rate of the engine oil is equal to or more than a reference value.

18 Claims, 10 Drawing Sheets

APPARATUS OF CONTROLLING ENGINE AND METHOD THEREOF

CROSS REFERENCE TO RELATED APPLICATIONS

This application claims priority to and the benefit of Korean Patent Application No. 10-2023-0182798 filed in the Korean Intellectual Property Office on Dec. 15, 2023, the entire contents of which are incorporated herein by reference.

BACKGROUND

(a) Field

The present disclosure relates to an apparatus of controlling an engine and a method thereof, and more particularly, to an apparatus of controlling an engine and a method thereof, which calculate a fuel amount incorporated into an engine oil, and providing the calculated fuel amount to a driver.

(b) Description of the Related Art

In general, a diesel engine has a disadvantage in that despite the outstanding fuel efficiency and output, since combustion is made in a state of a large air overload rate due to characteristics of the diesel engine, so an emission amount of carbon monoxide (CO) or hydrocarbons (HC) in emitted gas is small, unlike a gasoline engine, while a significantly large amount of nitrogen oxide (hereinafter referred to as "NOx") and particle materials are emitted.

The emission of the particle materials (PM) is significantly reduced through combustion control, but the particle materials (PM) and NOx have an opposite relationship to each other, so when NOx is reduced, the particle materials (PM) increase, and on the contrary, when the particle materials (PM) is reduced, NOx increases, and as a result, there is a situation in which it is difficult to reduce both at the same time.

In particular, in recent years, the particle materials (PM) have been reported in various media as the most important main cause of polluting the atmosphere, and are known to have a harmful effect on a human body. As a method of reducing the particle materials (PM), a diesel particle filter (DPF) is mounted on a diesel vehicle.

The diesel particle filter (DPF) physically collects in the filter the particle materials (PM) emitted from the diesel engine, and then combusts and removes the particle materials (PM) collected in the filter by raising a temperature exhaust gas to a predetermined temperature or more by post injection.

However, due to the installation of an apparatus that dissolves or reduces the nitrogen oxide (NOX), the amount of nitrogen dioxide flowing into the diesel particle filter (DPF) is significantly reduced, and a natural regeneration effect due to the reaction of soot and nitrogen dioxide collected in the DPF is significantly reduced.

Thus, in order to maintain the performance of the DPF, the DPF is regenerated at a predetermined period. When regenerating the DPF, a DPF carrier temperature must be maintained at a predetermined temperature (e.g., 600 to 650 degrees), and to this end, post injection of fuel is performed for the engine.

However, when the fuel is post-injected as such, some fuel flows down the wall of a cylinder and flows into an oil pan. Whenever the post injection is continued, the fuel amount in the engine oil continuously increases, and as a result, the viscosity of the engine oil is lowered. When the viscosity of the engine oil is lowered, the lubrication performance of the engine oil may be lowered and parts may be damaged.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an apparatus of controlling an engine and a control method thereof, which can prevent a problem due to dilution of engine oil by notifying a driver of an exchange cycle of the engine oil in advance when fuel is diluted with the engine oil.

An exemplary embodiment of the present disclosure provides an apparatus of controlling an engine, which may include a controller determining an inflow fuel amount adsorbed on an inner wall of a cylinder, and introduced into an oil pan based on the density of a combustion chamber and a post injection fuel amount, determining a vaporization fuel amount vaporized in the inflow fuel amount based on an operating condition of an engine, determining a consumption fuel amount consumed in the vaporization fuel amount based on the operating condition of the engine, and determining a dilution rate of the engine oil based on the inflow fuel amount, the vaporization fuel amount, and the consumption fuel amount; and a display providing an alarm to a driver when the dilution rate of the engine oil is equal to or more than a reference value.

In some exemplary embodiments, the inflow fuel amount may be mapped in advance according to the density of the combustion chamber and the post injection fuel amount.

In some exemplary embodiments, the controller may correct the inflow fuel amount by an injection pressure of post injected fuel.

In some exemplary embodiments, the controller may correct the inflow fuel amount to increase as the injection pressure of the fuel is high, and correct the inflow fuel amount to decrease as the injection pressure of the fuel is low.

In some exemplary embodiments, the controller may correct the inflow fuel amount by a cooling water temperature.

In some exemplary embodiments, the controller may correct the inflow fuel amount to increase as the cooling water temperature is low, and correct the inflow fuel amount to decrease as the cooling water temperature is high.

In some exemplary embodiments, the vaporization fuel amount may be mapped based on an engine speed and an engine load.

In some exemplary embodiments, the consumption fuel amount may mapped based on the engine speed and the engine load.

In some exemplary embodiments, the controller may correct the consumption fuel amount by a temperature of engine oil.

In some exemplary embodiments, the controller may correct the consumption fuel amount to increase as the temperature of the engine oil is high, and correct the consumption fuel amount to decrease as the temperature of the engine oil is low.

Another exemplary embodiment of the present disclosure provides a method of controlling an engine, which may include determining, by a controller, an inflow fuel amount adsorbed on an inner wall of a cylinder, and introduced into an oil pan based on the density of a combustion chamber and a post injection fuel amount; determining, by the controller, a vaporization fuel amount vaporized in the inflow fuel amount based on a vaporization level of engine oil; determining, by the controller, a consumption fuel amount consumed in the vaporized fuel amount based on an operating condition of an engine, determining, by the controller, a dilution rate of the engine oil based on the inflow fuel amount, the vaporized fuel amount, and the consumed fuel amount; and providing an alarm to a driver when the dilution rate of the engine oil is equal to or more than a reference value by the display.

In some exemplary embodiments, the inflow fuel amount may be mapped in advance according to the density of the combustion chamber and the post injection fuel amount.

In some exemplary embodiments, the inflow fuel amount may be corrected by an injection pressure of post injected fuel.

In some exemplary embodiments, the inflow fuel amount may be corrected to increase as the injection pressure of the fuel is high, and the inflow fuel amount may be corrected to decrease as the injection pressure of the fuel is low.

In some exemplary embodiments, the inflow fuel amount may be corrected by a cooling water temperature.

In some exemplary embodiments, the inflow fuel amount may be corrected to increase as the cooling water temperature is low, and the inflow fuel amount may be corrected to decrease as the cooling water temperature is high.

In some exemplary embodiments, the vaporization fuel amount may be mapped based on an engine speed and an engine load.

In some exemplary embodiments, the consumption fuel amount may be mapped based on the engine speed and the engine load.

In some exemplary embodiments, the consumption fuel amount may be corrected by a temperature of engine oil.

In some exemplary embodiments, the consumption fuel amount may be corrected to increase as the temperature of the engine oil is high, and the consumption fuel amount may be corrected to decrease as the temperature of the engine oil is low.

According to exemplary embodiments, engine oil is induced to be exchanged by providing an oil dilution rate to a driver to prevent parts of an engine from being damaged, and cost can be reduced, which is generated due to the exchange of the damaged parts.

Besides, an effect which can be obtained or predicted by the exemplary embodiment of the present disclosure is directly or implicitly disclosed in detailed description of the exemplary embodiment of the present disclosure. That is, various effects predicted according to the exemplary embodiment of the present disclosure will be disclosed in the detailed description to be described below.

BRIEF DESCRIPTION OF THE FIGURES

These drawings are for the purpose of describing an exemplary embodiment of the present disclosure, and therefore the technical spirit of the present disclosure should not be construed as being limited to the accompanying drawings.

Figure 1:
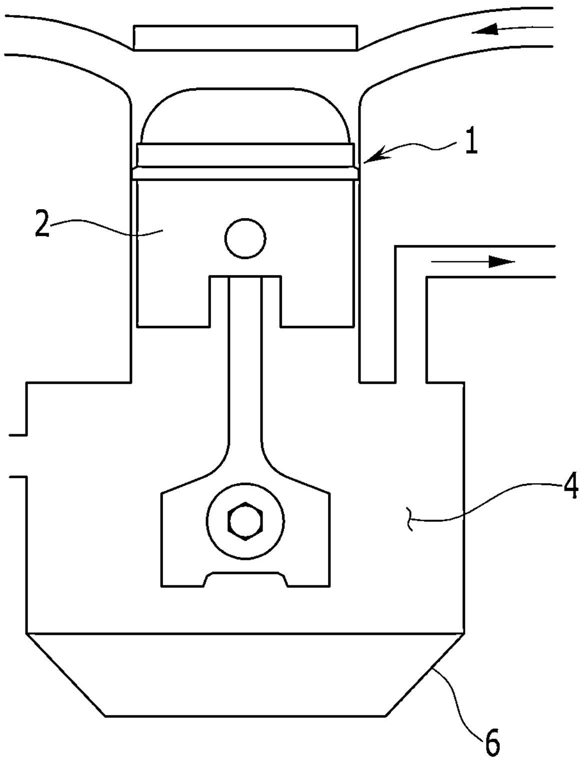
FIG. 1 is a block diagram illustrating a configuration of an apparatus of controlling an engine according to an exemplary embodiment.

The drawings referenced above are not particularly illustrated according to a scale, but should be understood as presenting a somewhat brief expression of various preferred features that illustrate the basic principles of the present disclosure. For example, the specific design features of the present disclosure, including specific dimensions, directions, positions, and shapes, will be partially determined by specific intended applications and use environments.

DETAILED DESCRIPTION

The terms used here are only for describing specific exemplary embodiments, and are not intended to limit the present disclosure. As used here, the singular forms are also intended to include plural forms, unless they are explicitly differently indicated by context. It will be appreciated that when terms "include" and/or "including" are used in this specification, the terms "include" and/or "including" are intended to designate the existence of mentioned features, integers, steps, operations, constituent elements, and/or components, but do not exclude the existence or addition of one or more other features, integers, steps, operations, constituent elements, and components, and/or groups thereof. As used herein, the terms "and/or" include any one or all combinations of the items which are associated and listed.

Additionally, it is appreciated that one or more of the following methods or aspects thereof can be executed by one or more controllers 20. The term "controller 20" may refer to a hardware device including a memory and a processor. The memory is configured to store program instructions, and the processor is particularly programmed to execute the program instructions in order to perform one or more processes which are described below in more detail. As disclosed herein, the controller 20 may control units, modules, parts, devices, or operations of those similar thereto. Further, as recognized by those skilled in the art, it is appreciated that the following methods may be executed by a device including the controller 20 jointly with one or more other components.

Further, the controller 20 of the present disclosure may be implemented as a non-transitory computer readable recording medium including executable program instructions executed by the processor. Examples of computer readable recording media include a ROM, a RAM, a compact disk (CD) ROM, magnetic tapes, floppy disks, flash drives, smart cards, and optical data storage devices, but are not limited thereto. The computer readable recording media are also distributed throughout a computer network, and program instructions may be stored and executed by a distribution scheme such as a telematics server or a controller (20) area network (CAN).

The present disclosure will be described in detail so as to be easily carried out by those skilled in the art in a technical field to which the present disclosure pertains. However, the present disclosure can be realized in various different forms, and is not limited to the exemplary embodiments described herein.

A part irrelevant to the description will be omitted to clearly describe the present disclosure, and the same elements will be designated by the same reference numerals throughout the specification.

Further, since size and thickness of each component illustrated in the drawings are arbitrarily represented for convenience in explanation, the present disclosure is not particularly limited to the illustrated size and thickness of each component and the thickness is enlarged and illustrated in order to clearly express various parts and areas.

Suffixes "module" and/or "unit" for components used in the following description are given or mixed in consideration of easy preparation of the present disclosure only and do not have their own distinguished meanings or roles.

Further, in describing a disclosed exemplary embodiment, a detailed description of related known technologies will be omitted if it is determined that the detailed description makes the gist of the embodiment of the present disclosure unclear.

Further, the accompanying drawings are provided for helping to easily understand exemplary embodiments disclosed in the present specification, and the technical spirit disclosed in the present specification is not limited by the accompanying drawings, and it will be appreciated that the present disclosure includes all of the modifications, equivalent matters, and substitutes included in the spirit and the technical scope of the present disclosure.

Terms including an ordinary number, such as first and second, are used for describing various constituent elements, but the constituent elements are not limited by the terms.

In the description below, the expression described by the singular can be interpreted as a singular or plurality, unless an explicit expression such as "one" or "single" is used.

The terms are used only to discriminate one component from another component.

Hereinafter, an apparatus of controlling an engine according to an exemplary embodiment will be described in detail with reference to the accompanying drawings.

FIG. 1 is a block diagram illustrating a configuration of an apparatus of controlling an engine according to an exemplary embodiment. In addition, FIG. 2 is a diagram illustrating a configuration of the engine according to an exemplary embodiment.

Figure 2:
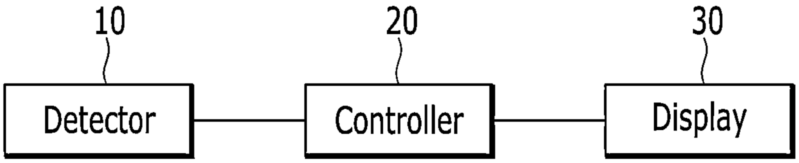
FIG. 2 is a diagram illustrating a configuration of the engine according to an exemplary embodiment.

As illustrated in FIGS. 1 and 2, the apparatus of controlling an engine according an exemplary embodiment may include a detector 10 detecting operating information, a controller 20 determining a dilution rate of engine oil based on the operating information detected by the detector 10, and a display 30 providing a notification to a driver according to the dilution rate of the engine oil.

The detector 10 may detect operating information including a post injection fuel amount, a density of a combustion chamber 4, a cooling water temperature, an injection pressure of post-injected fuel, an engine load, an engine speed, and a temperature of the engine oil.

Post injection may be performed after pilot injection and main injection. The post injection may be performed after top dead center (TDC).

The post injection fuel amount may mean a fuel amount injected to the inside of the combustion chamber 4 upon post injection, and the density of the combustion chamber 4 may mean the post injection fuel amount compared to a volume of the combustion chamber 4 at the time of the post injection. A fuel amount adsorbed on an inner wall of a cylinder 1 upon the post injection may be determined through the post injection fuel amount and the density of the combustion chamber 4. The detector 10 may detect the post injection fuel amount through communication with an engine controller (ECU). The detector 10 may detect a position of a piston 2 (or a position of a crankshaft) upon the post injection through the communication with the engine controller (ECU), detect the volume of the combustion chamber 4 from the position of the piston 2, and determine the density of the combustion chamber 4 through the volume of the combustion chamber 4 and the post injection fuel amount.

The fuel amount adopted on the inner wall of the cylinder 1 (or an incorporation fuel amount incorporated into the oil pan 6) may be corrected based on the injection pressure of the post-injected fuel. The detector 10 may detect the injection pressure of the post-injected fuel through the communication with the engine controller (ECU).

The fuel amount adopted on the inner wall of the cylinder 1 (or the incorporation fuel amount incorporated into the oil pan 6) may be corrected based on the cooling water temperature. The detector 10 may detect the cooling water temperature through a temperature sensor that detects the cooling water temperature.

An operating condition of the engine may be determined through the engine load and the engine speed, and a fuel amount vaporized in the oil pan 6 and a fuel amount consumed in the vaporized fuel amount may be determined through the operating condition of the engine. The detector 10 may detect the engine load and the engine speed through the communication with the engine controller (ECU).

The fuel amount consumed in the vaporized fuel may be corrected based on the temperature of the engine oil. The detector 10 may detect the temperature of the engine oil from an oil temperature sensor that detects the temperature of the engine oil.

That is, the detector 10 may implemented through various sensors, and detect the operating information through the communication with the engine controller (ECU). The operating information detected by the detector 10 may be transmitted to the controller 20.

The controller 20 may determine the dilution rate of the engine oil based on the operating information detected by the detector 10. The dilution rate of the engine oil may mean the fuel amount incorporated into the engine oil compared to the engine oil amount.

To this end, the controller 20 may be implemented as one or more processors which operate by a set program, and a memory of the controller 20 stores program instructions programmed to perform each step of a control method of the engine according to an exemplary embodiment through one or more processors.

The display 30 may provide an alarm for notifying the driver of exchanging the engine oil when the dilution rate of the engine oil is equal to or more than a reference value. The display 30 may be implemented through a center fascia, a speaker, or a display device provided in a vehicle.

Hereinafter, the control method of the engine according to an exemplary embodiment will be described in detail with reference to the accompanying drawings.

Figure 3:
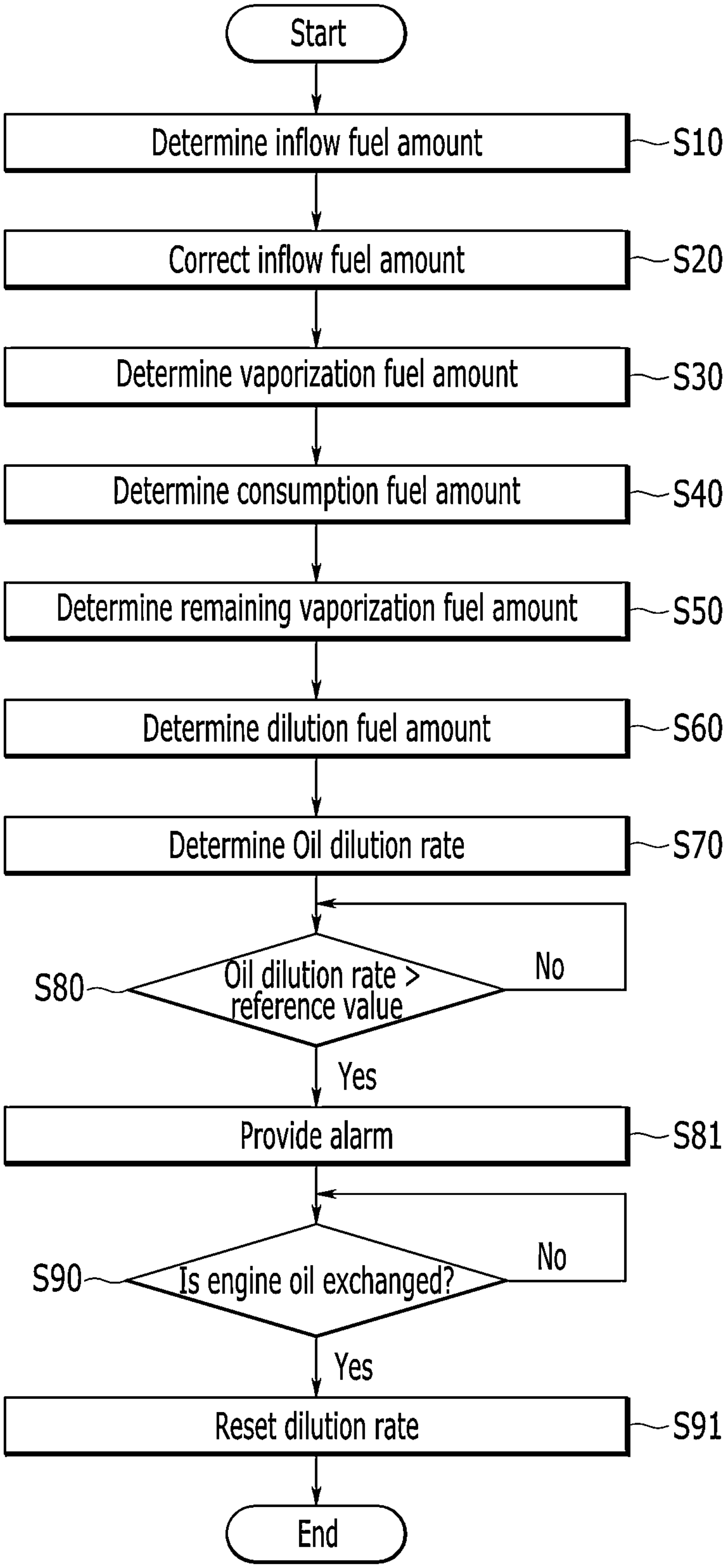
FIG. 3 is a flowchart illustrating a control method of the engine according to an exemplary embodiment.
Figure 4:
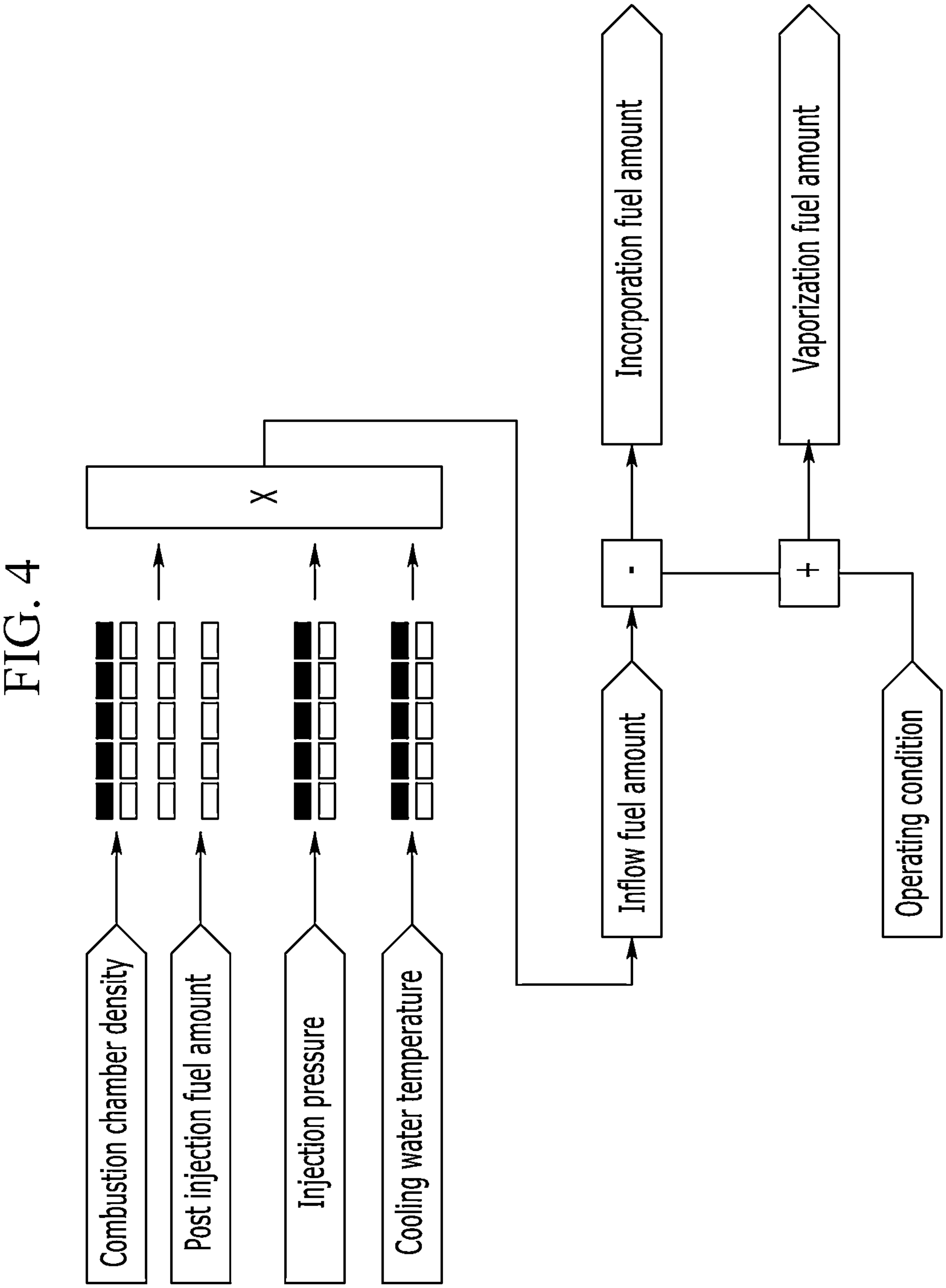
FIGS. 4, 5, 6 are diagrams describing the control method of the engine according to an exemplary embodiment.
Figure 5:
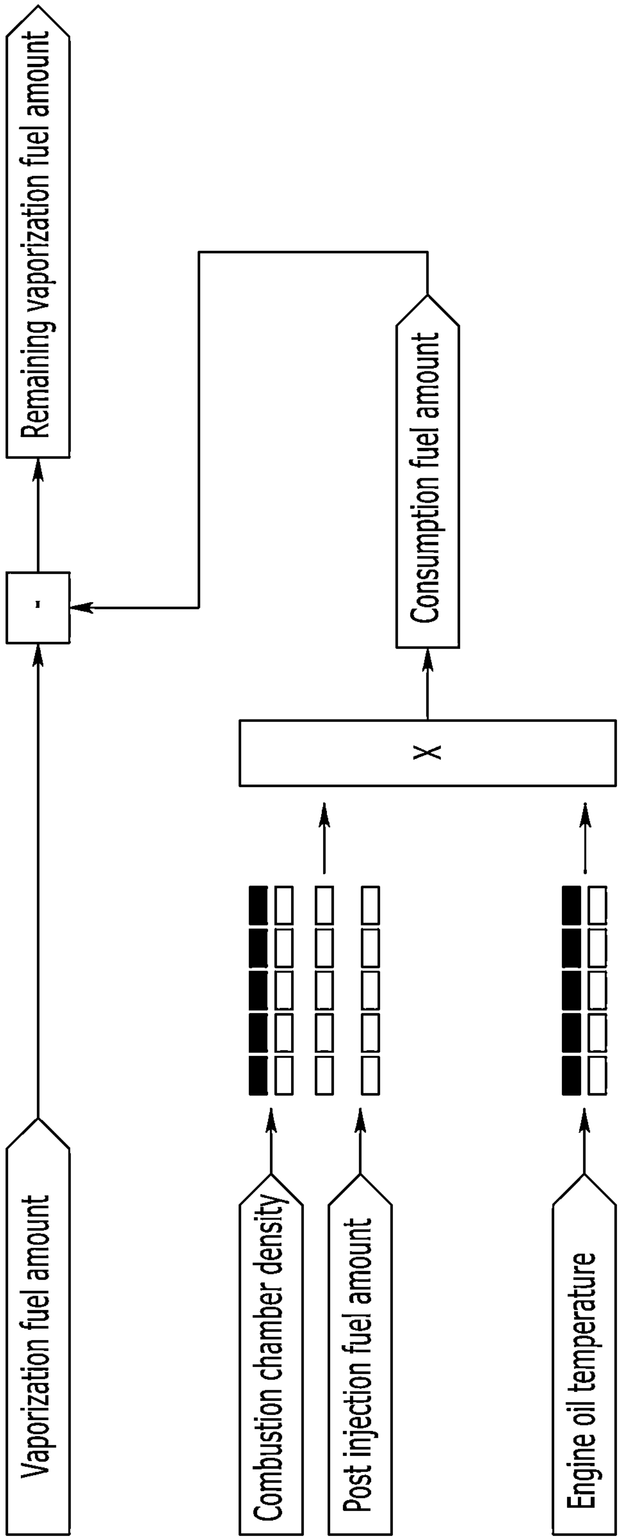
Figure 6:
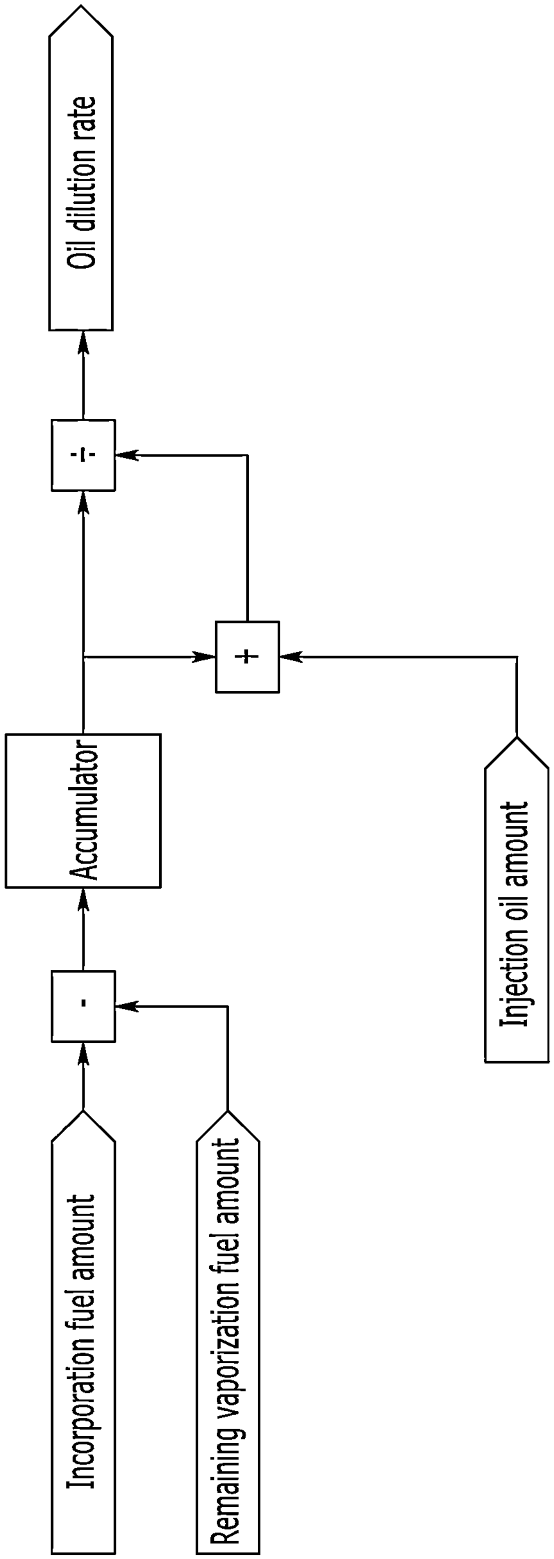

FIG. 3 is a flowchart illustrating a control method of the engine according to an exemplary embodiment. In addition, FIGS. 4 to 6 are diagrams describing the control method of the engine according to an exemplary embodiment.

Referring to FIGS. 3 to 6, the controller 20 may determine an inflow fuel amount introduced into the oil pan 6 from the combustion chamber 4 based on the density of the combustion chamber 4 and the post injection fuel amount upon post injection (S10).

The density of the combustion chamber 4 may be determined from the volume of the combustion chamber 4 and the post injection fuel amount upon the post injection. The inflow fuel amount flowing into the oil pan 6 from the combustion chamber 4 may be mapped according to the density of the combustion chamber 4 and the post injection fuel amount. That is, the inflow fuel amount may be stored in the controller 20 in a map data type according to the density of the combustion chamber 4 and the post injection fuel amount.

The volume of the combustion chamber 4 may be continuously changed by up and down reciprocation movement of the piston 2, and as a result, the density of the combustion chamber 4 may also be continuously changed. That is, the density of the combustion chamber 4 may be determined according to the position of the piston 2 at the time of the post injection.

When the piston 2 moves in a downward direction in the combustion chamber 4, fuel adsorbed on the inner wall of the cylinder 1 may be introduced into the oil pan 6 while an outer surface of the piston 2 moves along the inner wall of the cylinder 1.

When the volume of the combustion chamber 4 is small, an area of the inner wall of the cylinder 1 is also small, so the fuel amount adsorbed on the inner wall of the cylinder 1 is relatively small. When the volume of the combustion chamber 4 is larger, the area of the inner wall of the cylinder 1 is also large, so the fuel amount adsorbed on the inner wall of the cylinder 1 is relatively large. Accordingly, the fuel amount adsorbed on the inner wall of the cylinder 1 may be determined by mapping the density of the combustion chamber 4 and the post injection fuel amount, and through this, the inflow fuel amount introduced into the oil pan 6 from the combustion chamber 4 may be determined.

As necessary, the inflow fuel amount introduced into the oil pan 6 may be corrected (S20).

The inflow fuel amount introduced into the oil pan 6 may be corrected by the injection pressure of the post-injected fuel.

When the injection pressure of the post injection fuel is low, fuel injected from an injector may not be sufficiently injected up to the inner wall of the cylinder 1, and may be injected only to an internal center of the combustion chamber 4. Therefore, when the injection pressure of the fuel upon the post injection is low, the fuel amount adopted on the inner wall of the cylinder 1 is small, and the post injection fuel amount incorporated into the oil pan 6 may be corrected to decrease.

Contrary to this, when the injection pressure of the post injection fuel is high, the fuel injected from the injector may be sufficiently injected up to the inner wall of the cylinder 1, and the fuel amount adsorbed on the inner wall of the cylinder 1 may be large. Therefore, when the injection pressure of the fuel upon the post injection is high, the post injection fuel amount incorporated into the oil pan 6 may be corrected to increase.

Further, the inflow fuel amount introduced into the oil pan 6 may be corrected by the cooling water temperature.

When the cooling water temperature is low, the viscosity of the fuel adsorbed on the inner wall of the cylinder 1 increases, so it may be difficult for the fuel adsorbed on the inner wall of the cylinder 1 to flow downward along the inner wall of the cylinder 1. Therefore, when the cooling water temperature is low, the post injection fuel amount incorporated into the oil pan 6 may be corrected to decrease.

Contrary to this, when the cooling water temperature is high, the viscosity of the fuel adsorbed on the inner wall of the cylinder 1 decreases, so it is easy for the fuel adsorbed on the inner wall of the cylinder 1 to flow downward along the inner wall of the cylinder 1. Therefore, when the cooling water temperature is high, the post injection fuel amount incorporated into the oil pan 6 may be corrected to increase.

The controller 20 may determine a vaporization fuel amount which is a vaporized fuel amount in the inflow fuel amount based on the operating condition of the engine (S30).

The operating condition of the engine may be determined by the engine load and the engine speed. The engine load may be determined from an indicated mean effective pressure (IMEP). The indicated mean effective pressure (IMEP) may be defined by dividing a work of one cycle at a calculated mean pressure consumed in the piston 2 of the engine by a stroke volume (a value acquired by multiplying an area of the piston 2 and a moved distance). The IMEP may represent torque generated by combustion.

Some fuel in the fuel introduced into the oil pan 6 from the combustion chamber 4 is incorporated with the engine oil of the oil pan 6, but the remaining fuel is not incorporated into the engine oil, but may be vaporized. The vaporization fuel amount which is not incorporated into the engine oil, but vaporized may be determined by an experiment. The vaporization fuel amount according to the operating condition of the engine may be mapped in advance. That is, the vaporization fuel amount may be determined by the experiment, and stored in the controller 20 in the map data type.

Since the flow of the engine foil and the temperature of the engine oil are changed according to the operating condition of the engine (the engine load and the engine speed), the vaporization fuel amount may be determined from the experiment according to the operating condition of the engine. For example, when the engine is actuated under a high-speed and high-load condition, some fuel introduced into the oil pan 6 is not incorporated into the engine oil, but may be vaporized.

The controller 20 may determine a consumption fuel amount which is consumed in the vaporized fuel amount based on the operating condition of the engine (S40).

Some fuel in the fuel introduced into the oil pan 6 and vaporized is consumed and eliminated, and the consumption fuel amount consumed in the vaporization fuel amount vaporized may be determined according to the operating condition of the engine (the engine load and the engine speed).

Some of the fuel vaporized in the oil pan 6 may not remain in the oil pan 6, but may be re-introduced into the combustion chamber 4 as blow by gas, and consumed according to the operating condition of the engine. The vaporized fuel which does not remain in the oil pan 6, but is re-introduced into the combustion chamber 4, and consumed may be the consumption fuel amount. The consumption fuel amount may be mapped in advance according to the operating condition of the engine determined by the engine load and the engine speed. That is, the consumption fuel amount may be stored in the controller 20 in the map data type according to the engine load and the engine speed.

As necessary, the controller 20 may correct the consumption fuel amount by the temperature of the engine oil. When the temperature of the engine oil is high, the fuel amount which is consumed jointly with the engine oil increases, and when the temperature of the engine oil is low, the consumed engine oil and fuel amount are relatively reduced. Accordingly, the controller 20 may correct the consumption fuel amount to increase as the temperature of the engine oil becomes higher, and correct the consumption fuel amount to decrease as the temperature of the engine oil becomes lower.

The controller 20 subtracts the consumed fuel amount from the vaporized fuel amount to determine a remaining vaporization fuel amount (S50).

The controller 20 adds the fuel amount incorporated into the engine oil and the remaining vaporization fuel amount to determine a dilution fuel amount diluted in the engine oil (S60).

The controller 20 may calculate the dilution fuel amount diluted in the engine oil every set cycle, and accumulate the dilution fuel amount every set cycle and determine the accumulated dilution fuel amount. For example, the controller 20 may calculate the dilution fuel amount diluted in the engine oil every stroke of the engine every set cycle, and accumulate the dilution fuel amount calculated every stroke and determine the accumulated dilution fuel amount.

The controller 20 may determine an oil dilution rate based on the accumulated dilution fuel amount and the engine oil amount (S70). The oil dilution rate may be determined as the accumulated diluted fuel amount compared to the engine oil amount injected into the vehicle.

When the oil dilution rate is equal to or more than a reference value (S80), the controller 20 may provide an alarm to the driver through the display 30 (S81). The controller 20 may induce the driver to exchange the engine oil through the alarm provided through the display 30.

Figure 7A:
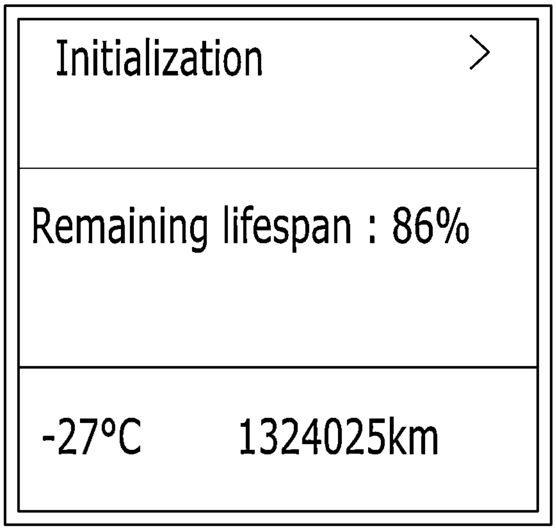
FIGS. 7A, 7B, and 7C are diagrams describing a display providing an alarm according to an exemplary embodiment.

When the oil dilution rate is less than a first reference value (for example, when the engine oil is in a normal state), the controller 20 may display a remaining lifespan of the engine oil through the display 30 (see FIG. 7A).

Figure 7B:
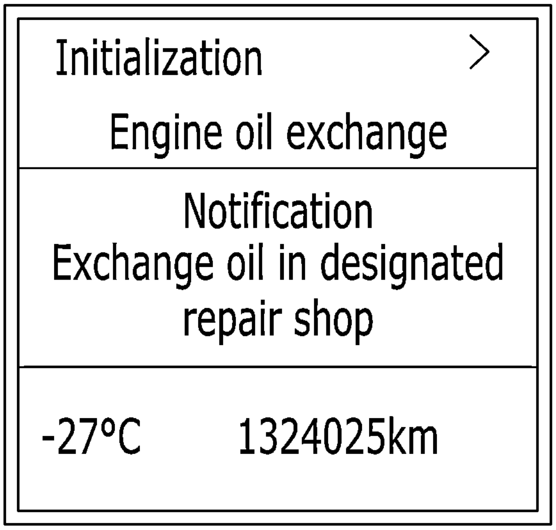

When the oil dilution rate is equal to or more than the first reference value, the controller 20 may provide a primary alarm to the driver through the display 30. The primary alarm may mean a state in which the remaining lifespan of the engine oil reaches a first set level or less (e.g., 10% or less), and the display 30 may notify the driver that the engine oil needs to be exchanged (see FIG. 7B).

Figure 7C:
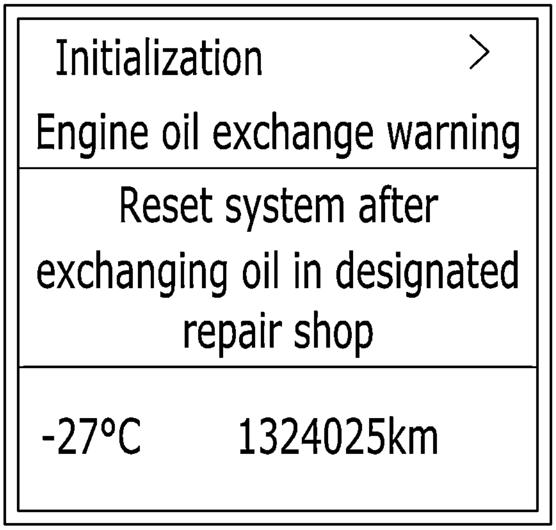

When the oil dilution rate is equal to or more than a second reference value larger than the first reference value, the controller 20 may provide a secondary alarm to the driver through the display 30. The secondary alarm may mean a state in which the remaining lifespan of the engine oil reaches a second set level or less (e.g., 2.5% or less), and the display 30 may notify the driver that the exchange of the engine oil is very urgent (see FIG. 7C).

When the engine oil is exchanged (S90), the oil dilution rate may be reset (S91).

Figure 8:
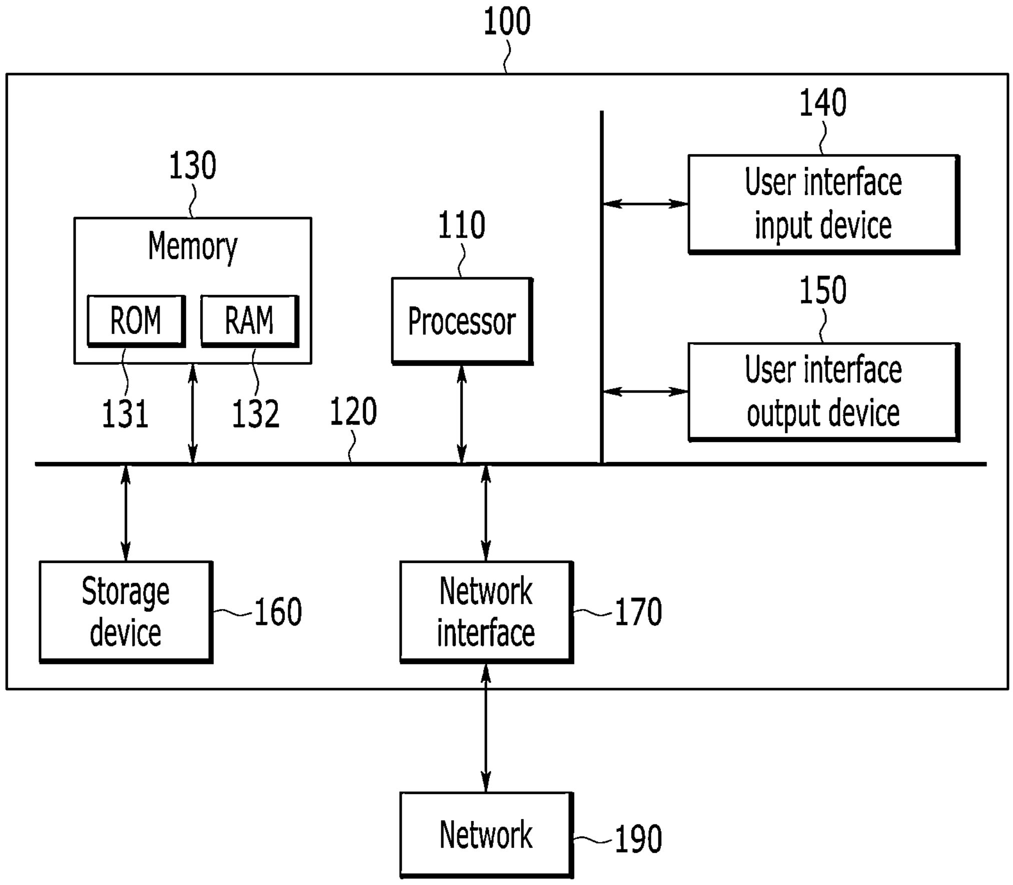
FIG. 8 is a diagram describing a computing device according to an exemplary embodiment.

FIG. 8 is a diagram describing a computing device according to an exemplary embodiment.

Referring to FIG. 8, the control method of the engine according to an exemplary embodiment may be implemented by using the computing device 100.

The computer device 100 may include at least one of a processor 110, a memory 130, a user interface input device 140, a user interface output device 150, and a storage device 160 which communicate with each other through a bus 120. The computing device 100 may also include a network interface 170 electrically connected to a network 190. The network interface 170 may transmit or receive a signal to or from another entity through the network 190.

The processor 110 may be implemented as various types including a micro controller unit (MCU), an application processor (AP), a central processing unit (CPU), a graphic processing unit (GPU), and a neural processing unit (NPU), and may be an arbitrary semiconductor device that executes an instruction stored in the memory 130 or the storage device 160. The processor 110 may be configured to implement the functions and methods in relation to FIGS. 1 to 7.

The memory 130 and the storage device 160 may be various types of volatile or non-volatile storage media. For example, the memory may include a read only memory (ROM) 131 and a random access memory (RAM) 132. In the exemplary embodiment, the memory 130 may be positioned inside or outside the processor 110 and connected with the processor 110 by various well-known means.

In some exemplary embodiments, at least some components or functions of the control method of the engine according to the exemplary embodiments may be implemented as a program or software executed by the computing device 100 or the program or software may be stored in a computer readable medium.

In some exemplary embodiments, at least some components or functions of the control method of the engine according to the exemplary embodiments may be implemented by using hardware or a circuit of the computing device 100 or as a separate hardware or circuit which may be electrically connected to the computing device 100.

According to the apparatus for controlling the engine and the method thereof according to exemplary embodiments, the oil dilution rate of the engine oil may be determined by the post injection fuel, and when the oil dilution rate is equal to or more than the reference value, it may be notified to the driver that the engine oil needs to be exchanged. Through this, the parts of the engine may be prevented from being damaged, and cost generated due to exchange of the damaged parts may be reduced.

Although a preferred embodiment of the present disclosure is described hereinabove, the present disclosure is not limited thereto, and various modifications can be made within the scope of the claims, and the detailed description of the present disclosure and the accompanying drawings, and belongs to the scope of the present disclosure, of course.

The invention claimed is:

1. An apparatus for of controlling an engine, the apparatus comprising:

a controller configured to:

determine an inflow fuel amount adsorbed on an inner wall of a cylinder, and introduced into an oil pan based on a density of a mixture within a combustion chamber and a post injection fuel amount;

determine a vaporization fuel amount vaporized in the inflow fuel amount based on an operating condition of the engine;

determine a consumption fuel amount consumed in the vaporization fuel amount based on the operating condition of the engine; and determine a dilution rate of engine oil based on the inflow fuel amount, the vaporization fuel amount, and the consumption fuel amount; and a display configured to provide an alarm to a driver when the dilution rate of the engine oil is equal to or more than a reference value;

wherein the vaporization fuel amount is mapped based on an engine speed and an engine load.

2. The apparatus of claim 1, wherein the inflow fuel amount is mapped in advance according to the density of the combustion chamber and the post injection fuel amount.

3. The apparatus of claim 2, wherein the controller is configured to correct the inflow fuel amount by an injection pressure of the post injection fuel amount.

4. The apparatus of claim 3, wherein the controller is configured to:

increase the inflow fuel amount as the injection pressure of the fuel increases; and decrease the inflow fuel amount as the injection pressure of the fuel decreases.

5. The apparatus of claim 2, wherein the controller is configured to correct the inflow fuel amount by a cooling water temperature.

6. The apparatus of claim 5, wherein the controller is configured to increase the inflow fuel amount as the cooling water temperature decreases, and decrease the inflow fuel amount as the cooling water temperature increases.

7. The apparatus of claim 1, wherein the consumption fuel amount is mapped based on an engine speed and an engine load.

8. The apparatus of claim 7, wherein the controller is configured to correct the consumption fuel amount by a temperature of the engine oil.

9. The apparatus of claim 8, wherein the controller is configured to:

increase the consumption fuel amount as the temperature of the engine oil increases; and decrease the consumption fuel amount as the temperature of the engine oil decreases.

10. A method of controlling an engine, comprising:

determining, by a controller, an inflow fuel amount adsorbed on an inner wall of a cylinder, and introduced into an oil pan based on a density of a mixture within a combustion chamber and a post injection fuel amount;

determining, by the controller, a vaporization fuel amount vaporized in the inflow fuel amount based on a vaporization level of engine oil;

determining, by the controller, a consumption fuel amount consumed in the vaporization fuel amount based on an operating condition of the engine;

determining, by the controller, a dilution rate of the engine oil based on the inflow fuel amount, the vaporized fuel amount, and the consumed fuel amount; and providing, on a display, an alarm to a driver in response to the dilution rate of the engine oil being equal to or more than a reference value;

wherein the vaporization fuel amount is mapped based on an engine speed and an engine load.

11. The method of claim 10, wherein the inflow fuel amount is mapped in advance according to the density of the combustion chamber and the post injection fuel amount.

12. The method of claim 11, wherein the inflow fuel amount is corrected by an injection pressure of post injected fuel.

13. The method of claim 12, wherein the inflow fuel amount increases as the injection pressure of the fuel increases, and the inflow fuel amount decreases as the injection pressure of the fuel decreases.

14. The method of claim 11, wherein the inflow fuel amount is corrected by a cooling water temperature.

15. The method of claim 14, wherein the inflow fuel amount increases as the cooling water temperature decreases, and the inflow fuel amount decreases as the cooling water temperature increases.

16. The method of claim 10, wherein the consumption fuel amount is mapped based on an engine speed and an engine load.

17. The method of claim 16, wherein the consumption fuel amount is corrected by a temperature of engine oil.

18. The method of claim 17, wherein the consumption fuel amount increases as the temperature of the engine oil increases, and the consumption fuel amount decreases as the temperature of the engine oil decreases.

* * * * *